US012712479B2

(12) United States Patent
Kataoka et al.

(10) Patent No.: US 12,712,479 B2
(45) Date of Patent: Aug. 18, 2026

(54) MOTOR CONTROL DEVICE

(71) Applicant: NIDEC CORPORATION, Kyoto (JP)

(72) Inventors: Kotaro Kataoka, Kyoto (JP); Tomohiro Fukumura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 268 days.

(21) Appl. No.: 18/693,948

(22) PCT Filed: Jun. 17, 2022

(86) PCT No.: PCT/JP2022/024253
§ 371 (c)(1),
(2) Date: Mar. 21, 2024

(87) PCT Pub. No.: WO2023/053600
PCT Pub. Date: Apr. 6, 2023

(65) Prior Publication Data

US 2024/0388235 A1 Nov. 21, 2024

(30) Foreign Application Priority Data

Sep. 30, 2021 (JP) ................................ 2021-162377

(51) Int. Cl.
*H02P 27/14* (2006.01)

(52) U.S. Cl.
CPC .................................. *H02P 27/14* (2013.01)

(58) Field of Classification Search
CPC ................................ H02P 27/14; H02M 7/48
See application file for complete search history.

(56) References Cited

U.S. PATENT DOCUMENTS 5,959,430 A * 9/1999 Yuki ...................... H02P 21/09 318/805
7,327,181 B2 2/2008 Hussein
(Continued)

FOREIGN PATENT DOCUMENTS

JP 2002-204579 A 7/2002
JP 3447366 B2 9/2003
(Continued)

OTHER PUBLICATIONS

International Search Report in PCT/JP2022/024253, mailed Sep. 6, 2022, 5pp.

*Primary Examiner* — Rina I Duda
(74) *Attorney, Agent, or Firm* — HAUPTMAN HAM, LLP

(57) ABSTRACT

A motor control device includes a conversion circuit that is connected to an n-phase motor, and a control unit that controls the conversion circuit based on n-phase duty command values updated at a predetermined update cycle. When the control unit predicts, based on the n-phase duty command values, that voltage fluctuations of at least two-phase connection terminals among the n-phase connection terminals connected to the n-phase motor occur in the same direction and at the same timing, the control unit delays the occurrence timing of the voltage fluctuation of one of the two-phase connection terminals by a first time and advances the occurrence timing of the voltage fluctuation of another connection terminal by a second time. The total value of the first time and the second time is a predetermined time during which predetermined occurrence timings of the voltage fluctuations of the two-phase connection terminals do not overlap each other.

6 Claims, 11 Drawing Sheets

(56) References Cited

U.S. PATENT DOCUMENTS

| | | | | |
|---|---|---|---|---|
| 8,390,223 | B2 * | 3/2013 | Nakamura | H02P 21/06 318/432 |
| 9,093,932 | B2 * | 7/2015 | Osaki | H02P 6/28 |
| 9,531,307 | B2 * | 12/2016 | Mendoza | H02P 6/14 |
| 2009/0167220 | A1 * | 7/2009 | Kanamori | H02P 6/20 318/400.11 |
| 2011/0234140 | A1 * | 9/2011 | Kuroda | H02P 3/18 318/503 |
| 2014/0176027 | A1 * | 6/2014 | Osaki | H02P 6/28 318/400.2 |
| 2015/0075195 | A1 * | 3/2015 | Suzuki | H02P 6/28 62/157 |

FOREIGN PATENT DOCUMENTS

| | | |
|---|---|---|
| JP | 2005-051959 A | 2/2005 |
| JP | 2008-125178 A | 5/2008 |
| JP | 2014-033503 A | 2/2014 |
| JP | 2020-072607 A | 5/2020 |

* cited by examiner

MOTOR CONTROL DEVICE

CROSS-REFERENCE TO RELATED APPLICATIONS

This is the U.S. national stage of application No. PCT/JP2022/024253, filed on Jun. 17, 2022, and priority under 35 U.S.C. § 119(a) and 35 U.S.C. § 365(b) is claimed from Japanese Patent Application No. 2021-162377, filed on Sep. 30, 2021.

FIELD OF THE INVENTION

The present invention relates to a motor control device.

BACKGROUND

Conventionally, a technique of generating three-phase pulse width modulation (PWM) signals using three types of basic voltage vectors in an inverter device that supplies a three-phase AC voltage to a three-phase motor, and generating a switching signal to be supplied to each of at least six switching elements included in the inverter device on the basis of the three-phase PWM signals is known.

For example, at the moment when the switching timings of the two-phase PWM signals among the three-phase PWM signals match, a potential difference (shaft voltage) between the output shaft of the motor and the motor case may greatly fluctuate instantaneously. This may cause noise.

In another respect, electrolytic corrosion may occur in the rotor bearing of the motor due to the shaft voltage. As a result of studies by the inventors of the present application, it has been found that particularly this noise may affect the occurrence of electrolytic corrosion.

SUMMARY

One aspect of an exemplary motor control device of the present invention is a motor control device that controls an n-phase motor (n is an integer of 3 or more). The exemplary motor control device includes a power conversion circuit that is connected to the n-phase motor and performs mutual conversion between the DC power and the n-phase AC power, and a control unit that controls the power conversion circuit based on n-phase duty command values updated at a predetermined update cycle. When the control unit predicts, based on the n-phase duty command values, that voltage fluctuations of at least two-phase connection terminals among the n-phase connection terminals connected to the n-phase motor occur in the same direction and at the same timing, the control unit delays the occurrence timing of the voltage fluctuation of one of the two-phase connection terminals by a first time and advances the occurrence timing of the voltage fluctuation of the other connection terminal by a second time. The total value of the first time and the second time is a predetermined time during which predetermined occurrence timings of the voltage fluctuations of the two-phase connection terminals do not overlap each other.

The above and other elements, features, steps, characteristics and advantages of the present disclosure will become more apparent from the following detailed description of the preferred embodiments with reference to the attached drawings.

DETAILED DESCRIPTION

An embodiment of the present invention will be described in detail below with reference to the drawings.

Figure 1:
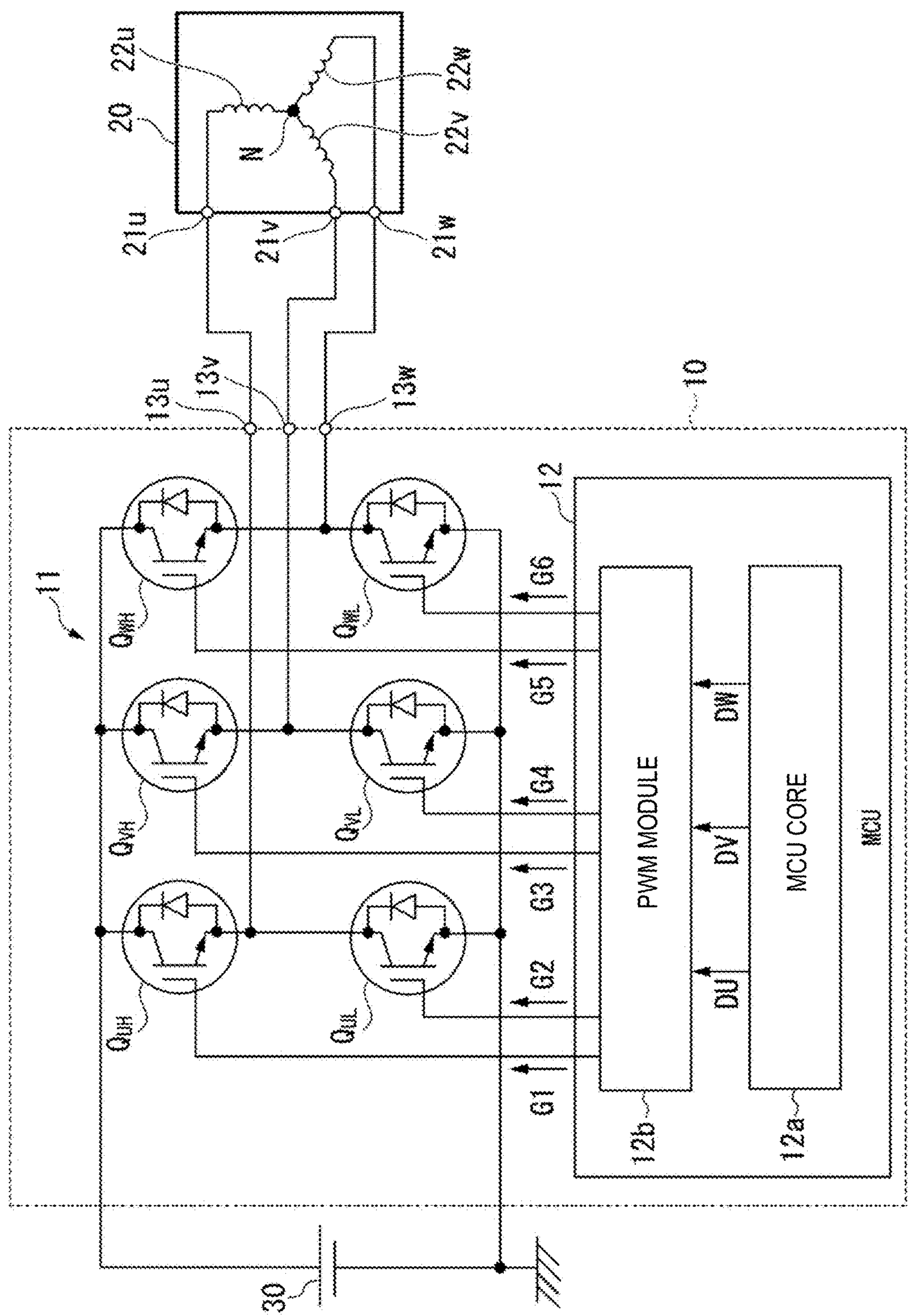
FIG. 1 is a circuit block diagram schematically illustrating the configuration of a motor control device according to a first embodiment of the present invention.

FIG. 1 is a circuit block diagram schematically illustrating the configuration of a motor control device 10 according to the present embodiment. As illustrated in FIG. 1, the motor control device 10 controls a three-phase motor 20. For example, the three-phase motor 20 is an inner rotor type three-phase brushless DC motor. The three-phase motor 20 is, for example, a driving motor (traction motor) mounted on an electric vehicle.

The three-phase motor 20 includes a U-phase terminal 21*u*, a V-phase terminal 21*v*, a W-phase terminal 21*w*, a U-phase coil 22*u*, a V-phase coil 22*v*, and a W-phase coil 22*w*. Although not illustrated in FIG. 1, the three-phase motor 20 includes a motor case, and a rotor and a stator housed in the motor case. The rotor is a rotating body rotatably supported by a bearing component such as a rotor bearing inside the motor case. The rotor has an output shaft coaxially joined to the rotor in a state of axially penetrating the radially inner side of the rotor. The stator is fixed inside the motor case in a state of surrounding an outer peripheral surface of the rotor, and generates an electromagnetic force necessary for rotating the rotor.

The U-phase terminal 21*u*, the V-phase terminal 21*v*, and the W-phase terminal 21*w* are metal terminals each exposed from a surface of the motor case. The U-phase terminal 21*u* is connected to a U-phase connection terminal 13*u* of the motor control device 10. The V-phase terminal 21*v* is connected to a V-phase connection terminal 13*v* of the motor control device 10. The W-phase terminal 21*w* is connected to a W-phase connection terminal 13*w* of the motor control device 10. The U-phase coil 22*u*, the V-phase coil 22*v*, and the W-phase coil 22*w* are excitation coils provided in the stator. As an example, the U-phase coil 22*u*, the V-phase coil 22*v*, and the W-phase coil 22*w* are star-connected inside the three-phase motor 20.

The U-phase coil 22*u* is connected between the U-phase terminal 21*u* and a neutral point N. The V-phase coil 22*v* is connected between the V-phase terminal 21*v* and the neutral point N. The W-phase coil 22*w* is electrically connected between the W-phase terminal 21*w* and the neutral point N. When the energization states of the U-phase coil 22*u*, the V-phase coil 22*v*, and the W-phase coil 22*w* are controlled by the motor control device 10, an electromagnetic force necessary for rotating the rotor is generated. When the rotor rotates, the output shaft also rotates in synchronization with the rotor.

The motor control device 10 includes a power conversion circuit 11 and a microcontroller unit (MCU) 12. The power conversion circuit 11 is connected to the three-phase motor 20 and performs mutual conversion between the DC power and the three-phase AC power. When the power conversion circuit 11 functions as an inverter, the power conversion circuit 11 converts the DC power supplied from the DC power supply 30 into three-phase AC power and outputs the three-phase AC power to the three-phase motor 20. As an example, the DC power supply 30 is one of a plurality of batteries mounted on an electric vehicle.

The power conversion circuit 11 includes a U-phase upper arm switch $Q_{UH}$, a V-phase upper arm switch $Q_{VH}$, a W-phase upper arm switch $Q_{WH}$, a U-phase lower arm switch $Q_{UL}$, a V-phase lower arm switch $Q_{VL}$, and a W-phase lower arm switch $Q_{WL}$. In the present embodiment, each arm switch is, for example, an insulated gate bipolar transistor (IGBT).

The collector terminal of the U-phase upper arm switch $Q_{UH}$, the collector terminal of the V-phase upper arm switch $Q_{VH}$, and the collector terminal of the W-phase upper arm switch $Q_{WH}$ each are connected to the positive electrode terminal of the DC power supply 30. The emitter terminal of the U-phase lower arm switch $Q_{UL}$, the emitter terminal of the V-phase lower arm switch $Q_{VL}$, and the emitter terminal of the W-phase lower arm switch $Q_{WL}$ each are connected to the negative electrode terminal of the DC power supply 30.

The emitter terminal of the U-phase upper arm switch $Q_{UH}$ is connected to each of the U-phase connection terminal 13*u* and the collector terminal of the U-phase lower arm switch $Q_{UL}$. That is, the emitter terminal of the U-phase upper arm switch $Q_{UH}$ is connected to the U-phase terminal 21*u* of the three-phase motor 20 via the U-phase connection terminal 13*u*. The emitter terminal of the V-phase upper arm switch $Q_{VH}$ is connected to each of the V-phase connection terminal 13*v* and the collector terminal of the V-phase lower arm switch $Q_{VL}$. That is, the emitter terminal of the V-phase upper arm switch $Q_{VH}$ is connected to the V-phase terminal 21*v* of the three-phase motor 20 via the V-phase connection terminal 13*v*. The emitter terminal of the W-phase upper arm switch $Q_{WH}$ is connected to each of the W-phase connection terminal 13*w* and the collector terminal of the W-phase lower arm switch $Q_{WL}$. That is, the emitter terminal of the W-phase upper arm switch $Q_{WH}$ is connected to the W-phase terminal 21*w* of the three-phase motor 20 via the W-phase connection terminal 13*w*.

The gate terminal of the U-phase upper arm switch $Q_{UH}$, the gate terminal of the V-phase upper arm switch $Q_{VH}$, and the gate terminal of the W-phase upper arm switch $Q_{WH}$ each are connected to the output terminal of the MCU 12. Further, the gate terminal of the U-phase lower arm switch $Q_{UL}$, the gate terminal of the V-phase lower arm switch $Q_{VL}$, and the gate terminal of the W-phase lower arm switch $Q_{WL}$ each are also connected to the output terminal of the MCU 12.

As described above, the power conversion circuit 11 is configured of a three-phase full-bridge circuit having three upper arm switches and three lower arm switches. The power conversion circuit 11 configured as described above performs mutual conversion between the DC power and the three-phase AC power by performing switching control of each arm switch by the MCU 12.

The MCU 12 is a control unit that controls the power conversion circuit 11 on the basis of three-phase duty command values updated at a predetermined update cycle.

The three-phase duty command values include a U-phase duty command value DU, a V-phase duty command value DV, and a W-phase duty command value DW. The MCU 12 includes an MCU core 12*a* and a PWM module 12*b*.

The MCU core 12*a* executes a command value calculation process of calculating at least three-phase duty command values according to a program stored in advance in a memory (not illustrated). Although not illustrated in FIG. 1, a torque command value output from the host control device is input to the MCU 12. For example, the host control device is an electronic control unit (ECU) mounted on an electric vehicle. For example, the MCU core 12*a* calculates a q-axis current command value and a d-axis current command value based on the torque command value, and calculates three-phase duty command values as three-phase voltage command values on the basis of these current command values. Torque control of the three-phase motor 20 is a known technique, and thus detailed description thereof is omitted in the present specification.

The MCU core 12*a* outputs the calculated three-phase duty command values, that is, a U-phase duty command value DU, a V-phase duty command value DV, and a W-phase duty command value DW, to the PWM module 12*b*. The PWM module 12*b* generates a gate control signal to be supplied to the gate terminal of each arm switch included in the power conversion circuit 11, on the basis of the U-phase duty command value DU, the V-phase duty command value DV, and the W-phase duty command value DW.

The gate control signal includes a U-phase upper gate control signal G1 supplied to the gate terminal of the U-phase upper arm switch $Q_{UH}$ and a U-phase lower gate control signal G2 supplied to the gate terminal of the U-phase lower arm switch $Q_{UL}$. The gate control signal also includes a V-phase upper gate control signal G3 supplied to the gate terminal of the V-phase upper arm switch $Q_{VH}$ and a V-phase lower gate control signal G4 supplied to the gate terminal of the V-phase lower arm switch $Q_{VL}$. In addition, the gate control signal includes a W-phase upper gate control signal G5 supplied to the gate terminal of the W-phase upper arm switch $Q_{WH}$ and a W-phase lower gate control signal G6 supplied to the gate terminal of the W-phase lower arm switch $Q_{WL}$. A dead time is inserted to each gate control signal in order to prevent the upper arm switch and the lower arm switch of the same phase from being simultaneously switched on.

Figure 2:
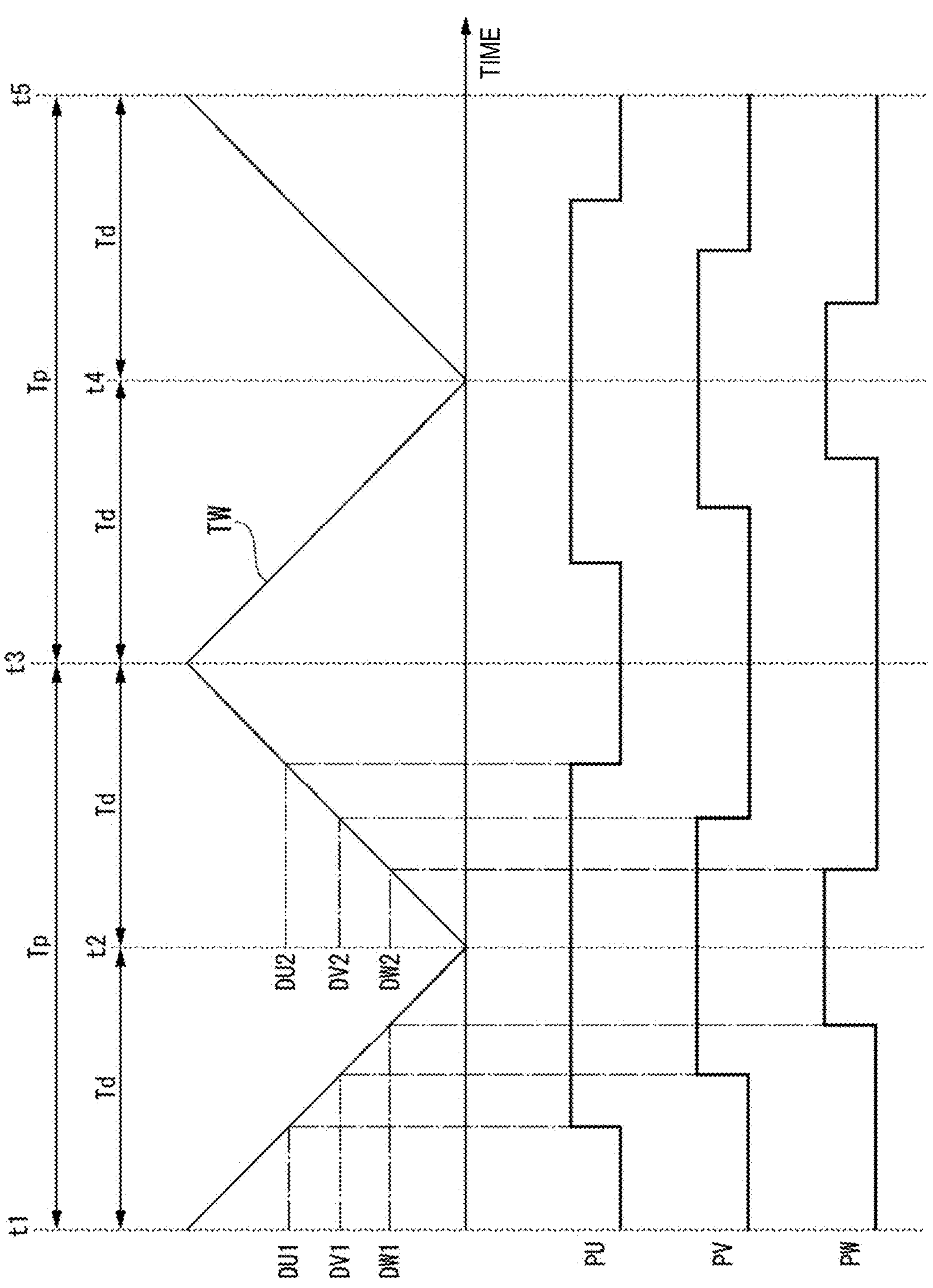
FIG. 2 is a diagram schematically illustrating the principle of generating three-phase PWM signals based on three-phase duty command values.

FIG. 2 is a diagram schematically illustrating the principle of generating three-phase PWM signals based on the three-phase duty command values. As illustrated in FIG. 2, the PWM module 12*b* generates a triangular wave TW having a predetermined cycle Tp. Hereinafter, the cycle Tp of the triangular wave TW may be referred to as a PWM cycle.

As an example, the triangular wave TW includes a count value of a PWM timer. In the example illustrated in FIG. 2, the count value of the PWM timer changes from the maximum value to the minimum value by the PWM timer operating in the countdown mode in the period from time t1 to time t2. Furthermore, in the period from time t2 to time t3, the count value of the PWM timer changes from the minimum value to the maximum value by the PWM timer operating in the count-up mode. A period from time t1 to time t3 corresponds to a cycle of the triangular wave TW, that is, PWM cycle Tp.

Each of the countdown period from time t1 to time t2 and the count-up period from time t2 to time t3 corresponds to a period of ½ of the PWM cycle Tp. The three-phase duty command values are updated at each of the countdown start time t1 and the count-up start time t2. That is, the update cycle Td of the three-phase duty command values corresponds to a period of ½ of the PWM cycle Tp.

In the PWM module 12*b*, a buffer register and an update register are allocated to each of the three duty command values included in the three-phase duty command values. The three-phase duty command value calculated by the MCU core 12*a* is first stored in the buffer register. Then, when the update timing such as the countdown start time t1 or the count-up start time t2 arrives, the three-phase duty command value stored in each buffer register is transferred to the update register. As described above, "the three-phase duty command value is updated" means that the three-phase duty command value is transferred from the buffer register to the update register at the update timing.

As described above, since the three-phase duty command value calculated by the MCU core 12*a* needs to be stored in the buffer register before the update timing arrives, the MCU core 12*a* calculates the three-phase duty command value at a timing earlier than the update timing. That is, the MCU core 12*a* calculates the three-phase duty command value to be updated at the countdown start time t1 at a timing earlier than the countdown start time t1, and outputs the calculated value to the PWM module 12*b*. In addition, the MCU core 12*a* calculates the three-phase duty command value to be updated at the count-up start time t2 at a timing earlier than the count-up start time t2, and outputs the calculated value to the PWM module 12*b*. In this manner, the MCU core 12*a* repeats the command value calculation process at the same cycle as the update cycle Td of the three-phase duty command value, but the command value calculation timing is earlier than the update timing.

As illustrated in FIG. 2, it is assumed that the U-phase duty command value DU is updated to "DU1", the V-phase duty command value DV is updated to "DV1", and the W-phase duty command value DW is updated to "DW1" at the countdown start time t1. The U-phase duty command value DU1 is larger than the V-phase duty command value DV1. The V-phase duty command value DV1 is larger than the W-phase duty command value DW1. "DU1", "DV1", and "DW1" are values in the update registers allocated to the duty command values respectively as described above.

When the triangular wave TW reaches the three-phase duty command values while the triangular wave TW is descending, the three-phase PWM signals each go to a high level. In other words, during the countdown operation of the PWM timer, the three-phase PWM signals each go to a high level at a timing when the count value of the PWM timer matches the three-phase duty command values.

Therefore, as illustrated in FIG. 2, in the countdown period from time t1 to time t2, the U-phase PWM signal PU goes to a high level at a timing when the count value of the PWM timer matches the U-phase duty command value DU1. In the countdown period from time t1 to time t2, the V-phase PWM signal PV goes to a high level at a timing when the count value of the PWM timer matches the V-phase duty command value DV1. In the countdown period from time t1 to time t2, the W-phase PWM signal PW goes to a high level at a timing when the count value of the PWM timer matches the W-phase duty command value DW1.

As illustrated in FIG. 2, it is assumed that the U-phase duty command value DU is updated to "DU2", the V-phase duty command value DV is updated to "DV2", and the W-phase duty command value DW is updated to "DW2" at the count-up start time t2. The U-phase duty command value DU2 is larger than the V-phase duty command value DV2. The V-phase duty command value DV2 is larger than the W-phase duty command value DW2. "DU2", "DV2", and "DW2" are values in the update registers allocated to the duty command values respectively as described above.

When the triangular wave TW reaches the three-phase duty command values while the triangular wave TW rises, the level of the three-phase PWM signals each go to a low level. In other words, during the count-up operation of the PWM timer, the three-phase PWM signals each go to a low level at the timing when the count value of the PWM timer matches the three-phase duty command values.

Therefore, as illustrated in FIG. 2, in the count-up period from time t2 to time t3, the U-phase PWM signal PU goes to a low level at the timing when the count value of the PWM timer matches the U-phase duty command value DU2. In the count-up period from time t2 to time t3, the V-phase PWM signal PV goes to a low level at the timing when the count value of the PWM timer matches the V-phase duty command value DV2. In the count-up period from time t2 to time t3, the W-phase PWM signal PW goes to a low level at the timing when the count value of the PWM timer matches the W-phase duty command value DW2.

The operation in the countdown period from time t3 to time t4 is the same as the operation in the countdown period from time t1 to time t2. The operation in the count-up period from time t4 to time t5 is the same as the operation in the count-up period from time t2 to time t3. The above operation is repeated in the update cycle Td of the three-phase duty command values, whereby the duty ratio of the three-phase PWM signals is individually controlled.

As can be understood from the above description, in the present embodiment, a mode in which the duty ratio of the PWM signal is controlled in a control mode so-called asymmetric center alignment mode in which the rising edge timing and the falling edge timing of the PWM signal are individually controlled is exemplified. However, the control mode of the PWM signal usable in the present invention is not limited to the asymmetric center alignment mode.

Figure 3:
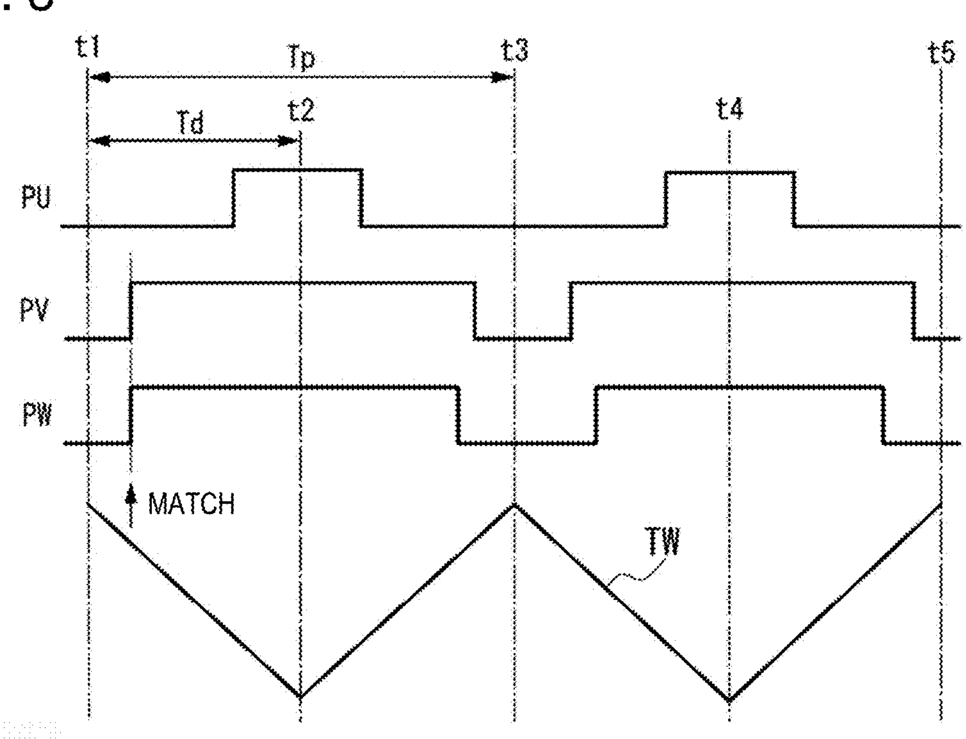
FIG. 3 is a timing chart illustrating an example in which a rising edge timing of a V-phase PWM signal matches a rising edge timing of a W-phase PWM signal.

As illustrated in FIG. 3, for example, when the V-phase duty command value DV and the W-phase duty command value DW are equal among the three-phase duty command values updated at the countdown start time t1, the rising edge timing of the V-phase PWM signal PV matches the rising edge timing of the W-phase PWM signal PW in the countdown period from time t1 to time t2.

As described above, due to the potential difference (shaft voltage) between the output shaft of the three-phase motor 20 and the motor case, electrolytic corrosion may occur in the rotor bearing of the three-phase motor 20. In the example illustrated in FIG. 3, the on-timing of the V-phase PWM signal PV matches the on-timing of the W-phase PWM signal PW in the $n^{th}$ PWM control cycle. As a result of the study by the inventors of the present application, it has been found that, at the moment when the switching timings of the two-phase PWM signals among the three-phase PWM signals match as illustrated in FIG. 3, a large instantaneous change in the axial voltage may affect the occurrence of electrolytic corrosion.

In the example of FIG. 3, for example, when the three-phase motor 20 is in the power running state and the V-phase and W-phase currents are positive (when the current flows from the power conversion circuit 11 toward the three-phase motor 20), when the switching timings of the V-phase PWM signal PV and the W-phase PWM signal PW overlap with each other, a rapid fluctuation of the axial voltage occurs. On the other hand, in a similar state, when the V-phase current is positive and the W-phase current is negative, when the turn-off of the V-phase high side and the turn-on of the W-phase low side overlap each other, or when the turn-on of the V-phase high side and the turn-off of the W-phase low side overlap each other, a rapid fluctuation of the axial voltage occurs.

In order to solve the above technical problem, the MCU 12 according to the present embodiment delays the timing of occurrence of the voltage fluctuation of one connection terminal of two-phase connection terminals by a first time and advances the timing of occurrence of the voltage fluctuation of the other connection terminal by a second time, when predicting that the voltage fluctuations of at least the two-phase connection terminals among the three-phase connection terminals 13*u*, 13*v*, and 13*w* connected to the three-phase motor 20 occur in the same direction and at the same timing, on the basis of the three-phase duty command values. The total value of the first time and the second time is a predetermined time ΔT in which occurrence timings of the voltage fluctuations of the predetermined two-phase connection terminals do not overlap. Hereinafter, in order to facilitate understanding of the present invention, the operation of the present embodiment will be described in comparison with a conventional technique.

The conventional technique is intended to avoid simultaneous switching of a plurality of phases. Hereinafter, the conventional technique is referred to as a comparison technique. In the comparison technique, when the edge timings of two-phase PWM signals among the three-phase PWM signals match, the rising edge timing and the falling edge timing of one of the two-phase PWM signals are delayed by a predetermined time ΔT.

Figure 4:
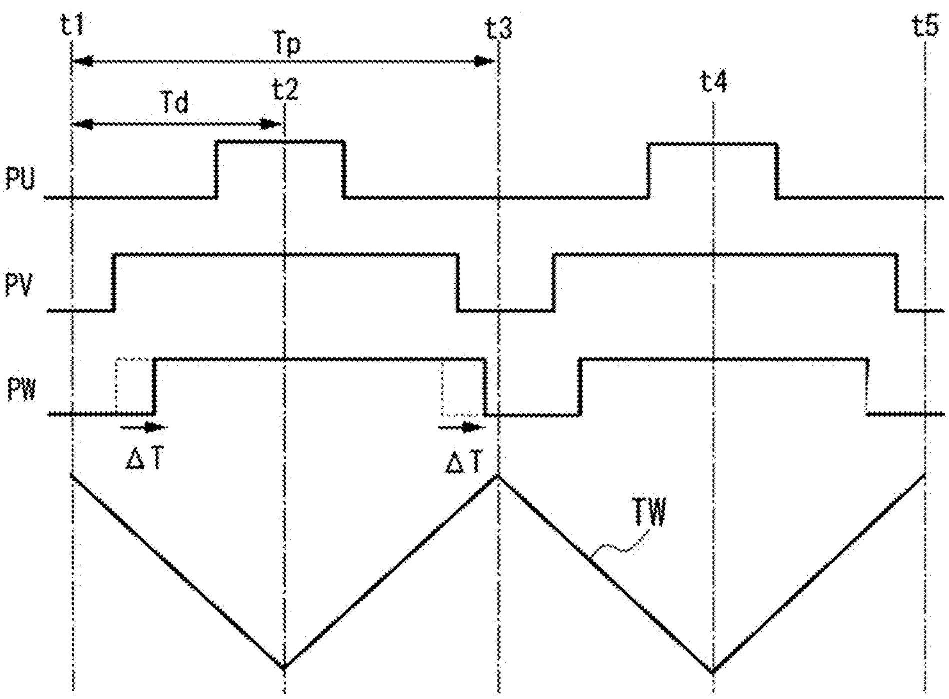
FIG. 4 is a timing chart illustrating an example of three-phase PWM signals generated by a comparison technique when a rising edge timing of a V-phase PWM signal matches a rising edge timing of a W-phase PWM signal.

For example, as illustrated in FIG. 3, it is assumed that the rising edge timing of the V-phase PWM signal PV and the rising edge timing of the W-phase PWM signal PW match in the countdown period from time t1 to time t2. In this case, as illustrated in FIG. 4, in the comparison technique, for example, the phase of the W-phase PWM signal PW is delayed by a predetermined time ΔT. As a result, since the rising edge timing of the W-phase PWM signal PW is delayed by the predetermined time ΔT with respect to the rising edge timing of the V-phase PWM signal PV, simultaneous switching between the V phase and the W phase is avoided. In addition, since the falling edge timing of the W-phase PWM signal PW is also delayed by the predetermined time ΔT, the duty ratio of the W-phase PWM signal PW does not change in one cycle of the PWM cycle Tp.

Figure 5:
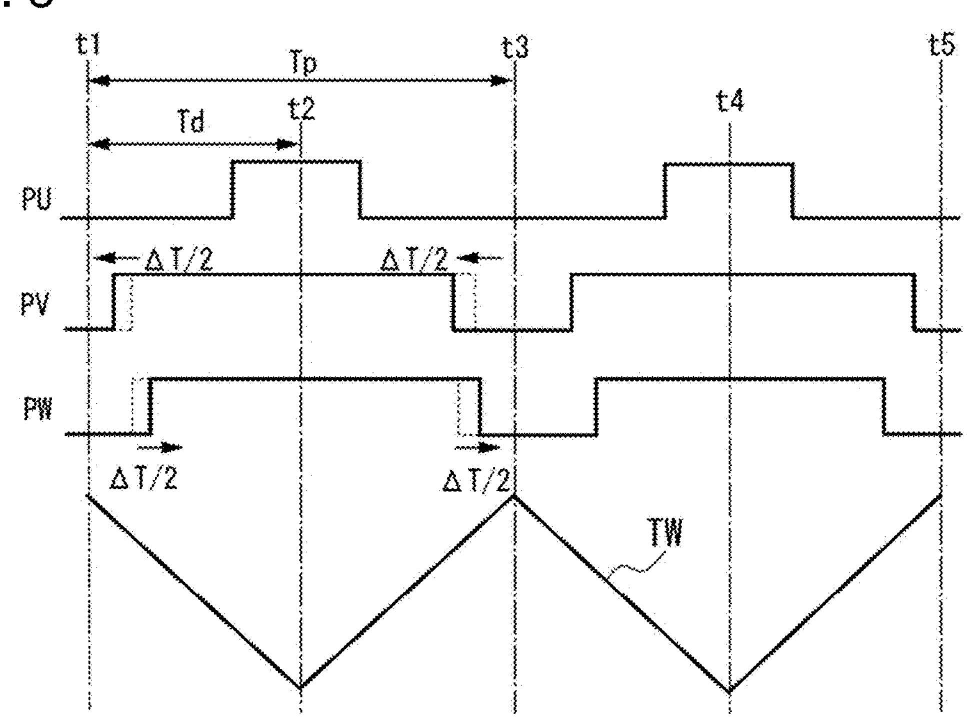
FIG. 5 is a timing chart illustrating an example of three-phase PWM signals generated by the present embodiment when a rising edge timing of a V-phase PWM signal matches a rising edge timing of a W-phase PWM signal.

FIG. 5 is a timing chart illustrating an example of the three-phase PWM signals generated according to the present embodiment in the case where the rising edge timing of the V-phase PWM signal and the rising edge timing of the W-phase PWM signal match in the countdown period from time t1 to time t2. As illustrated in FIG. 5, in the present embodiment, in the countdown period from time t1 to time t2, for example, the MCU 12 delays the rising edge timing of the W-phase PWM signal PW by a first time and advances the rising edge timing of the V-phase PWM signal PV by a second time. As an example, the MCU 12 determines each of the first time and the second time to be a value of ½ of the predetermined time ΔT. As a result, the time difference between the rising edge timing of the V-phase PWM signal PV and the rising edge timing of the W-phase PWM signal PW becomes relatively equal to the predetermined time ΔT, so that the simultaneous switching of the V-phase and the W-phase can be avoided.

As illustrated in FIG. 5, in the count-up period from time t2 to time t3, the MCU 12 delays the falling edge timing of the W-phase PWM signal PW by the first time and advances the falling edge timing of the V-phase PWM signal PV by the second time. As described above, in the present embodiment, the MCU 12 performs a compensation process of delaying the rising edge timing of the W-phase PWM signal PW by the first time and then delaying the next falling edge timing by the same first time. Similarly, after advancing the rising edge timing of the V-phase PWM signal PV by the second time, the MCU 12 performs a compensation process of advancing the next falling edge timing by the same second time. By performing these compensation processes, it is possible to suppress an influence on the motor control caused by the shift of the switching timings of the V phase and the W phase. In addition, in the comparison technique illustrated in FIG. 4, the phase of the PWM signal of one phase is shifted by ΔT, whereas in the technique of FIG. 5, the shift of the phase of the PWM signal per phase is set to be smaller than ΔT, so that an influence on the motor control caused by the shift of the switching timing can be further suppressed as compared with the comparison technique.

Hereinafter, the operation of the MCU 12 in the example illustrated in FIG. 5 will be described in detail.

The MCU core 12*a* of the MCU 12 executes a command value calculation process before the countdown start time t1 which is the update timing of the three-phase duty command values, and predicts whether or not the edge timings of two-phase PWM signals among the three-phase PWM signals match, on the basis of the three-phase duty command values calculated by the command value calculation process. For example, when the V-phase duty command value DV and the W-phase duty command value DW are equal among the three-phase duty command values calculated before the countdown start time t1, the MCU core 12*a* predicts that the rising edge timing of the V-phase PWM signal PV matches the rising edge timing of the W-phase PWM signal PW in the countdown period from time t1 to time t2.

When the MCU core 12*a* predicts that the rising edge timing of the V-phase PWM signal PV matches the rising edge timing of the W-phase PWM signal PW, the MCU core performs a correction process of subtracting a value corresponding to a first time ΔT/2 from the calculated value of the W-phase duty command value DW, and performs a correction process of adding a value corresponding to a second time ΔT/2 to the calculated value of the V-phase duty command value DV. The MCU core 12*a* outputs the U-phase duty command value DU calculated by the command value calculation process and the V-phase duty command value DV and the W-phase duty command value DW subjected to the correction process, to the PWM module 12*b*.

As described above, the three-phase duty command values input from the MCU core 12*a* to the PWM module 12*b* before the countdown start time t1 are temporarily stored in the buffer registers. Then, when the countdown start time t1 arrives, the three-phase duty command values stored in the buffer registers are transferred to the update registers. As described above, at the countdown start time t1, the contents of the update registers are updated to the new three-phase duty command values. As a result, as illustrated in FIG. 5, among the three-phase PWM signals generated by the PWM module 12*b* in the countdown period from time t1 to time t2, the rising edge timing of the W-phase PWM signal PW is delayed by the first time ΔT/2, and the rising edge timing of the V-phase PWM signal PV is advanced by the second time ΔT/2.

The MCU core 12*a* executes the command value calculation process again before the count-up start time t2 which is the next update timing of the three-phase duty command values. The MCU core 12*a* performs a compensation process on the duty command value subjected to the correction process at the time of execution of the previous command value calculation process, among the three-phase duty command values calculated by the current command value calculation process. For example, the MCU core 12*a* performs a compensation process of adding a value corresponding to the first time ΔT/2 to the calculated value of the W-phase duty command value DW among the three-phase duty command values calculated by the current command value calculation process, and performs a compensation process of subtracting a value corresponding to the second time ΔT/2 from the calculated value of the V-phase duty command value DV. The MCU core 12*a* outputs the U-phase duty command value DU calculated by the current command value calculation process and the V-phase duty command value DV and the W-phase duty command value DW subjected to the compensation process, to the PWM module 12*b*.

As described above, the three-phase duty command values input from the MCU core 12*a* to the PWM module 12*b* before the count-up start time t2 are temporarily stored in the buffer registers. Then, when the count-up start time t2 arrives, the three-phase duty command values stored in the buffer registers are transferred to the update registers. As described above, at the count-up start time t2, the contents of the update registers are updated to the new three-phase duty command values. As a result, as illustrated in FIG. 5, among the three-phase PWM signals generated by the PWM module 12*b* in the count-up period from time t2 to time t3, the falling edge timing of the W-phase PWM signal PW is delayed by the first time ΔT/2, and the falling edge timing of the V-phase PWM signal PV is advanced by the second time ΔT/2.

Figure 6:
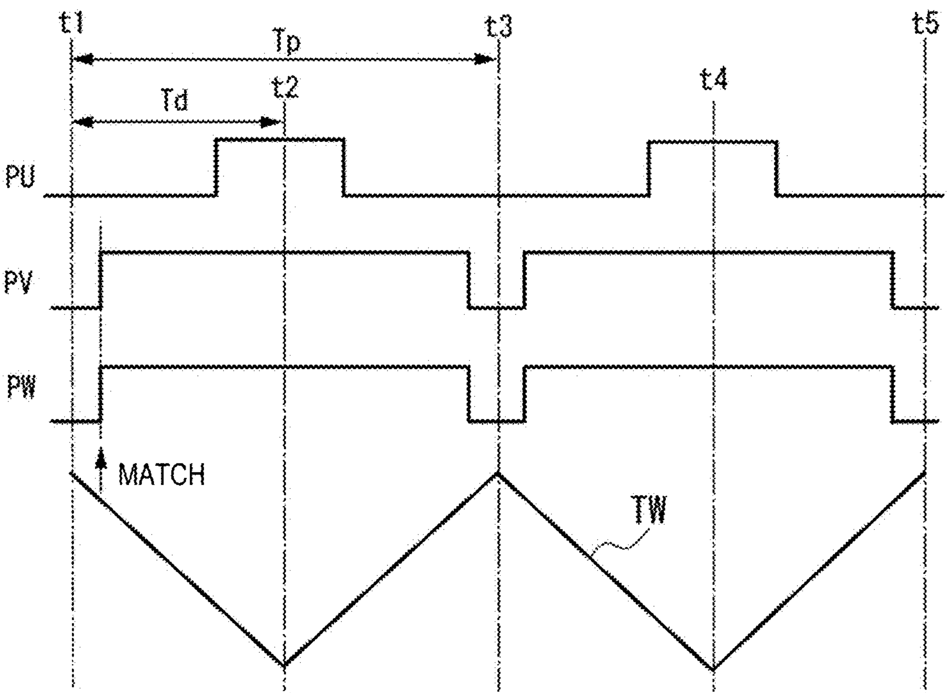
FIG. 6 is a timing chart illustrating an example in which a rising edge timing of a V-phase PWM signal matches a rising edge timing of a W-phase PWM signal in a state where the duty ratios of the V-phase PWM signal and the W-phase PWM signal are close to 100%.
Figure 7:
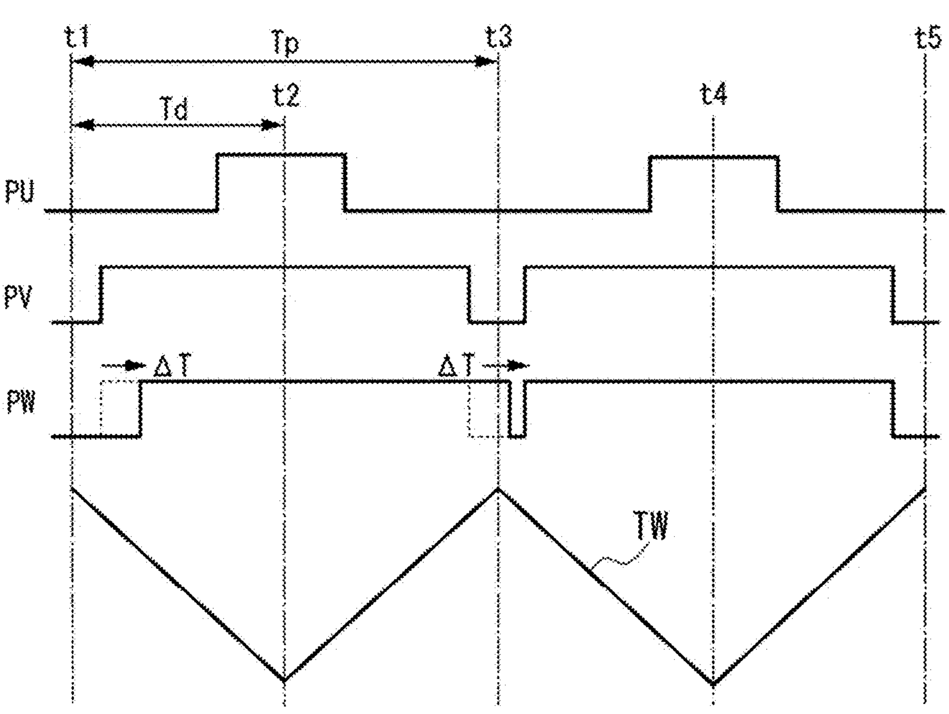
FIG. 7 is a timing chart illustrating an example of three-phase PWM signals generated by a comparison technique when a rising edge timing of a V-phase PWM signal matches a rising edge timing of a W-phase PWM signal in a state where the duty ratios of the V-phase PWM signal and the W-phase PWM signal are close to 100%.

Next, as illustrated in FIG. 6, it is assumed that the rising edge timing of the V-phase PWM signal matches the rising edge timing of the W-phase PWM signal in a state where the duty ratios of the V-phase PWM signal PV and the W-phase PWM signal PW are close to 100% in the countdown period from time t1 to time t2. In this case, as illustrated in FIG. 7, for example, when the phase of the W-phase PWM signal PW is delayed by the predetermined time ΔT based on the comparison technique, there is a possibility that the falling edge timing of the W-phase PWM signal PW exceeds the PWM cycle Tp. Therefore, in this case, PWM signals cannot be generated by a normal method of generating the PWM signals by comparing the triangular wave TW with the three-phase duty command values, and the program becomes complicated.

Figure 8:
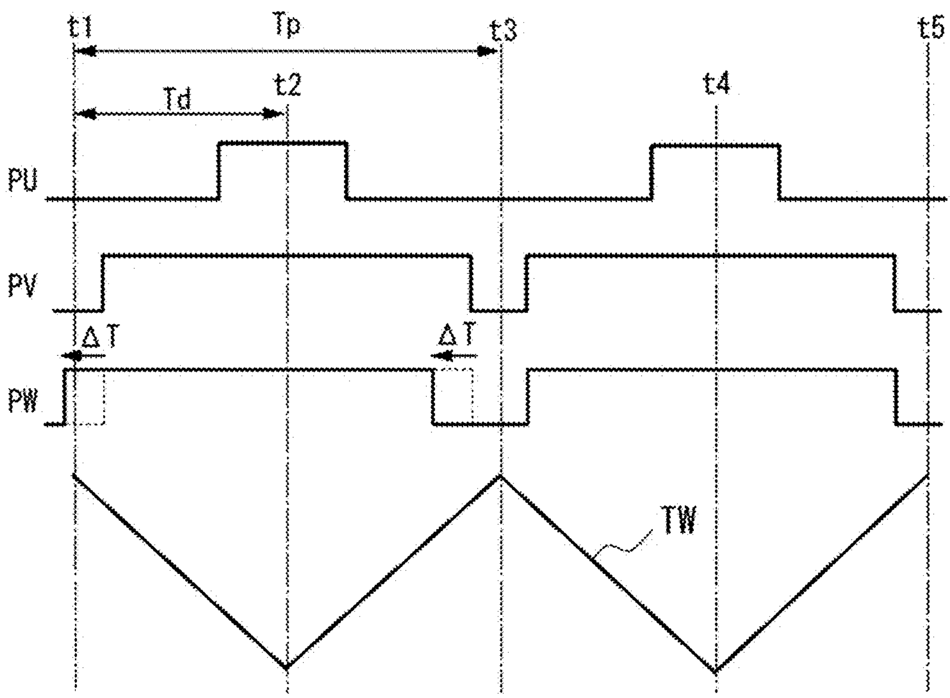
FIG. 8 is a timing chart illustrating an example of three-phase PWM signals generated by a comparison technique when a rising edge timing of a V-phase PWM signal matches a rising edge timing of a W-phase PWM signal in a state where the duty ratios of the V-phase PWM signal and the W-phase PWM signal are close to 100%.

On the contrary, as illustrated in FIG. 8, for example, when the phase of the W-phase PWM signal PW is advanced by the predetermined time ΔT, the rising edge timing of the W-phase PWM signal PW may exceed the PWM cycle Tp. Therefore, even in this case, PWM signals cannot be generated by a normal method of generating the PWM signals by comparing the triangular wave TW with the three-phase duty command values, and the program becomes complicated.

Figure 9:
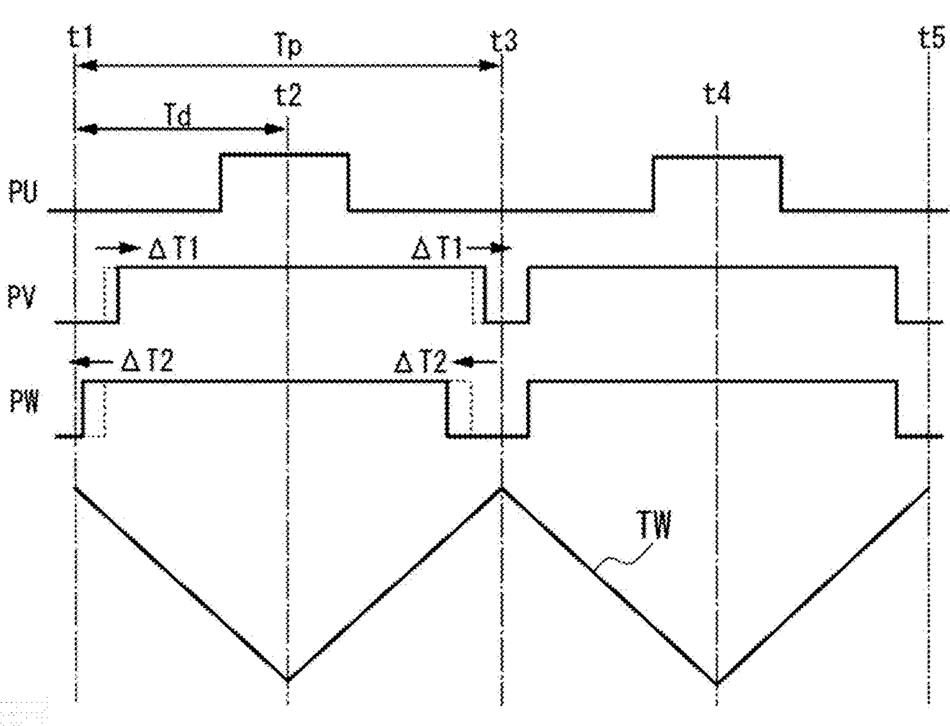
FIG. 9 is a timing chart illustrating an example of three-phase PWM signals generated by the present embodiment when a rising edge timing of a V-phase PWM signal matches a rising edge timing of a W-phase PWM signal in a state where the duty ratios of the V-phase PWM signal and the W-phase PWM signal are close to 100%.

FIG. 9 is a timing chart illustrating an example of three-phase PWM signals generated by the present embodiment when the rising edge timing of the V-phase PWM signal matches the rising edge timing of the W-phase PWM signal in a state where the duty ratios of the V-phase PWM signal and the W-phase PWM signal are close to 100%. As illustrated in FIG. 9, in the present embodiment, when the duty ratios of the voltage fluctuations of two-phase connection terminals at which the terminal voltage fluctuations are predicted to occur in the same direction and at the same timing are included in a range from a first threshold value to 100%, the MCU 12 sets the duty ratios of the voltage fluctuations of the two-phase connection terminals to 100% or less.

Specifically, in the countdown period from time t1 to time t2, for example, the MCU 12 delays the rising edge timing of the V-phase PWM signal PV by a first time ΔT1 and advances the rising edge timing of the W-phase PWM signal PW by a second time ΔT2. The total value of the first time ΔT1 and the second time ΔT2 is equal to the predetermined time ΔT. As a result, the time difference between the rising edge timing of the V-phase PWM signal PV and the rising edge timing of the W-phase PWM signal PW becomes relatively equal to the predetermined time ΔT, so that the simultaneous switching of the V-phase and the W-phase can be avoided. Even when the duty ratios of the V-phase PWM signal and the W-phase PWM signal are close to 100%, PWM signals can be generated by a normal method of generating the PWM signals by comparing the triangular wave TW with the three-phase duty command values. The first time ΔT1 and the second time ΔT2 each may be ½ of the predetermined time ΔT, but the first time ΔT1 and the second time ΔT2 may be appropriately adjusted so as to be within the same slope of the triangular wave TW even after the switching timing is shifted.

As illustrated in FIG. 9, in the count-up period from time t2 to time t3, the MCU 12 delays the falling edge timing of the V-phase PWM signal PV by the first time ΔT1 and advances the falling edge timing of the W-phase PWM signal PW by the second time ΔT2. As described above, in the present embodiment, the MCU 12 performs the compensation process of delaying the next falling edge timing by the same first time ΔT1 after delaying the rising edge timing of the V-phase PWM signal PV by the first time ΔT1. Similarly, after advancing the rising edge timing of the W-phase PWM signal PW by the second time ΔT2, the MCU 12 performs the compensation process of advancing the next falling edge timing by the same second time ΔT2. By performing these compensation processes, it is possible to suppress an influence on the motor control caused by the shift of the switching timings of the V phase and the W phase.

Hereinafter, the operation of the MCU 12 in the example illustrated in FIG. 9 will be described in detail.

The MCU core 12*a* of the MCU 12 executes a command value calculation process before the countdown start time t1 which is the update timing of the three-phase duty command values, and predicts whether or not the edge timings of two-phase PWM signals among the three-phase PWM signals match, on the basis of the three-phase duty command values calculated by the command value calculation process. For example, when the V-phase duty command value DV and the W-phase duty command value DW are equal among the three-phase duty command values calculated before the countdown start time t1, the MCU core 12*a* predicts that the rising edge timing of the V-phase PWM signal PV matches the rising edge timing of the W-phase PWM signal PW in the countdown period from time t1 to time t2.

When the MCU core 12*a* predicts that the rising edge timing of the V-phase PWM signal PV matches the rising edge timing of the W-phase PWM signal PW, and determines that duty ratios of the V-phase and the W phase are included in a range from a first threshold to 100%, the MCU core performs the correction process of subtracting a value corresponding to the first time ΔT/1 from the calculated value of the V-phase duty command value DV, and performs the correction process of adding a value corresponding to the second time ΔT/2 to the calculated value of the W-phase duty command value DW. The MCU core 12*a* outputs the U-phase duty command value DU calculated by the command value calculation process and the V-phase duty command value DV and the W-phase duty command value DW subjected to the correction process, to the PWM module 12*b*.

As described above, the three-phase duty command values input from the MCU core 12*a* to the PWM module 12*b* before the countdown start time t1 are temporarily stored in the buffer registers. Then, when the countdown start time t1 arrives, the three-phase duty command values stored in the buffer registers are transferred to the update registers. As described above, at the countdown start time t1, the contents of the update registers are updated to the new three-phase duty command values. As a result, as illustrated in FIG. 9, among the three-phase PWM signals generated by the PWM module 12*b* in the countdown period from time t1 to time t2, the rising edge timing of the V-phase PWM signal PV is delayed by the first time ΔT1, and the rising edge timing of the W-phase PWM signal PW is advanced by the second time ΔT2.

The MCU core 12*a* executes the command value calculation process again before the count-up start time t2 which is the next update timing of the three-phase duty command values. The MCU core 12*a* performs a compensation process on the duty command value subjected to the correction process at the time of execution of the previous command value calculation process, among the three-phase duty command values calculated by the current command value calculation process. For example, among the three-phase duty command values calculated by the current command value calculation process, the MCU core 12*a* performs the compensation process of adding a value corresponding to the first time ΔT1 to the calculated value of the V-phase duty command value DV, and performs the compensation process of subtracting a value corresponding to the second time ΔT2 from the calculated value of the W-phase duty command value DW. The MCU core 12*a* outputs the U-phase duty command value DU calculated by the current command value calculation process and the V-phase duty command value DV and the W-phase duty command value DW subjected to the compensation process, to the PWM module 12*b*.

As described above, the three-phase duty command values input from the MCU core 12*a* to the PWM module 12*b* before the count-up start time t2 are temporarily stored in the buffer registers. Then, when the count-up start time t2 arrives, the three-phase duty command values stored in the buffer registers are transferred to the update registers. As described above, at the count-up start time t2, the contents of the update registers are updated to the new three-phase duty command values. As a result, as illustrated in FIG. 9, among the three-phase PWM signals generated by the PWM module 12*b* in the count-up period from time t2 to time t3, the falling edge timing of the V-phase PWM signal PV is delayed by the first time ΔT1, and the falling edge timing of the W-phase PWM signal PW is advanced by the second time ΔT2.

Figure 10:
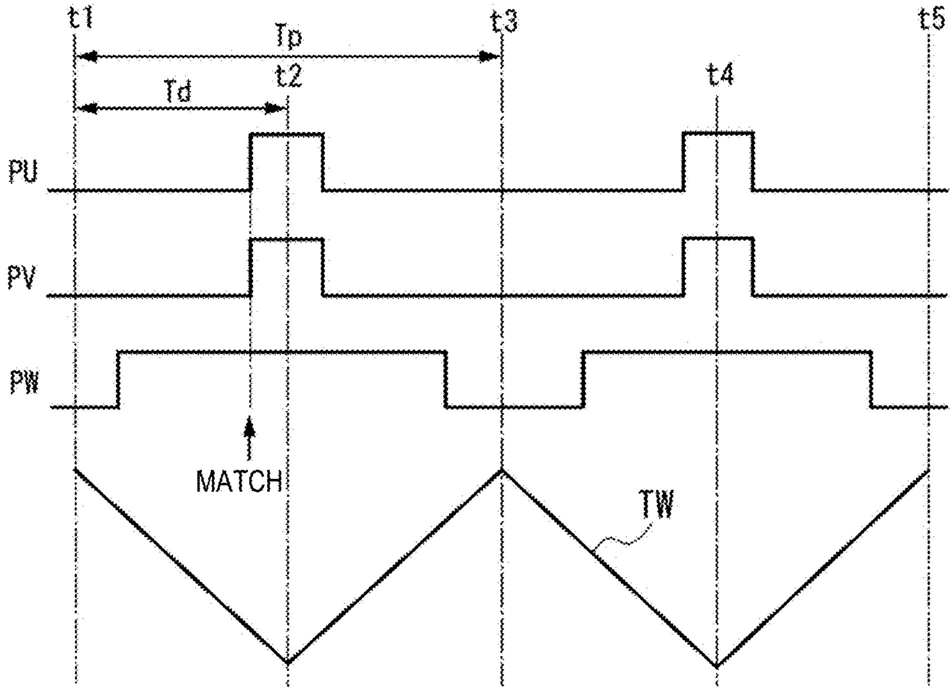
FIG. 10 is a timing chart illustrating an example in which a rising edge timing of a U-phase PWM signal matches a rising edge timing of a V-phase PWM signal in a state where the duty ratios of the U-phase PWM signal and the V-phase PWM signal are close to 0%.
Figure 11:
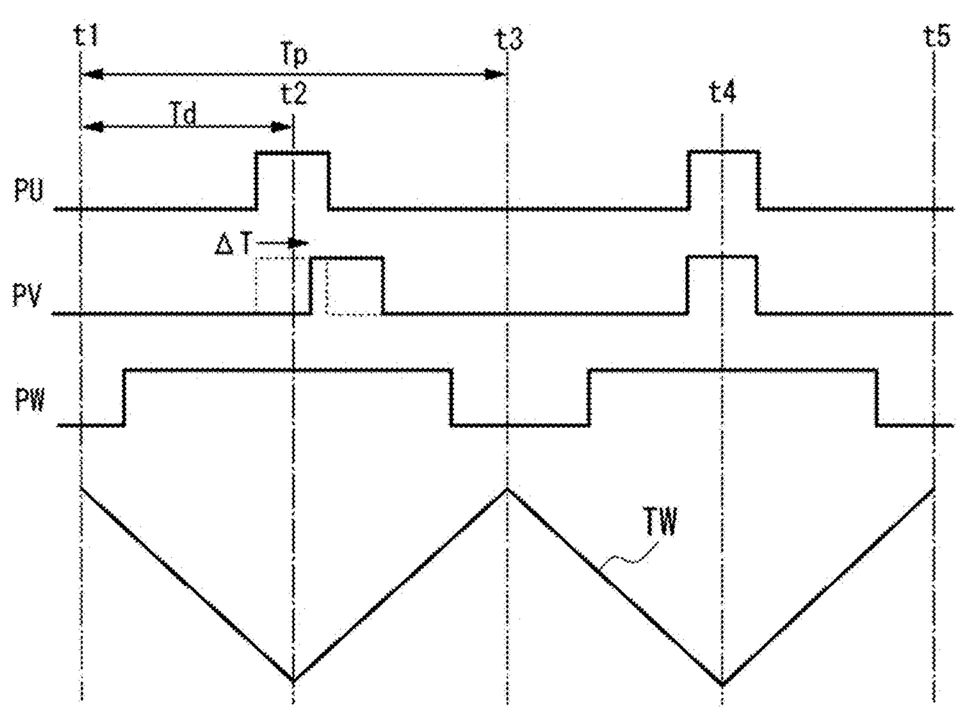
FIG. 11 is a timing chart illustrating an example of three-phase PWM signals generated by a comparison technique when a rising edge timing of a U-phase PWM signal matches a rising edge timing of a V-phase PWM signal in a state where the duty ratios of the U-phase PWM signal and the V-phase PWM signal are close to 0%.

Next, as illustrated in FIG. 10, it is assumed that the rising edge timing of the U-phase PWM signal PU matches the rising edge timing of the V-phase PWM signal PV in a state where the duty ratios of the U-phase PWM signal PU and the V-phase PWM signal PV are close to 0% in the countdown period from time t1 to time t2. In this case, as illustrated in FIG. 11, for example, when the phase of the V-phase PWM signal PV is delayed by the predetermined time ΔT based on the comparison technique, there is a possibility that the rising edge timing of the V-phase PWM signal PV exceeds the valley of the triangular wave TW to the rear side. Therefore, in this case, PWM signals cannot be generated by a normal method of generating the PWM signals by comparing the triangular wave TW with the three-phase duty command values, and the program becomes complicated.

Although not illustrated, conversely, when the phase of the V-phase PWM signal PW is advanced by the predetermined time ΔT, there is a possibility that the falling edge timing of the V-phase PWM signal PV exceeds the valley of the triangular wave TW to the front side. Therefore, even in this case, PWM signals cannot be generated by a normal method of generating the PWM signals by comparing the triangular wave TW with the three-phase duty command values, and the program becomes complicated.

Figure 12:
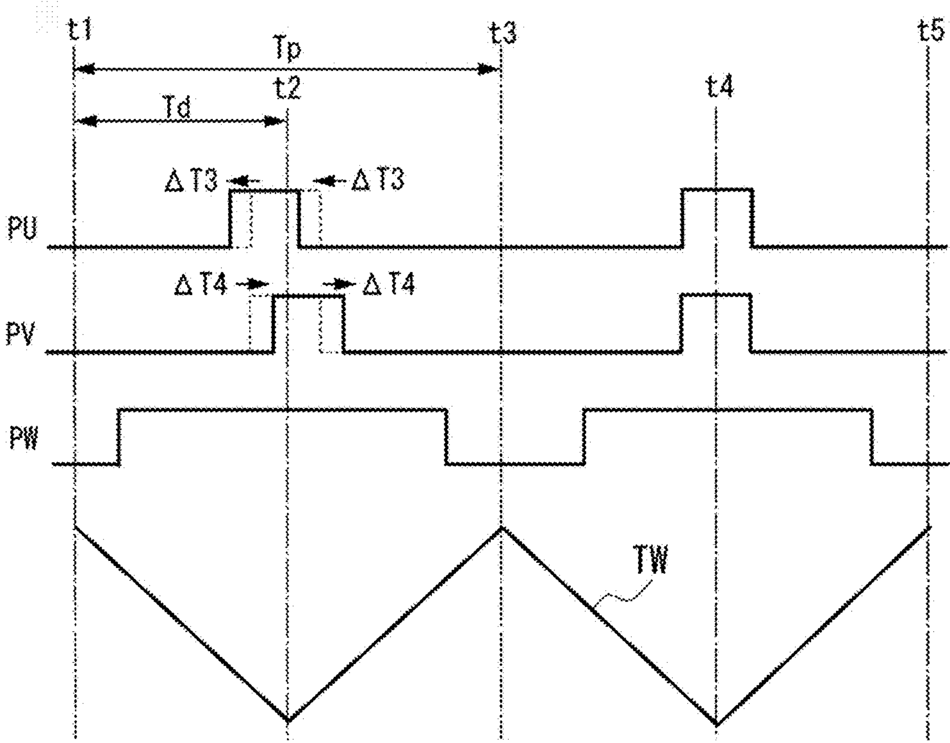
FIG. 12 is a timing chart illustrating an example of three-phase PWM signals generated by the present embodiment when a rising edge timing of a U-phase PWM signal matches a rising edge timing of a V-phase PWM signal in a state where the duty ratios of the U-phase PWM signal and the V-phase PWM signal are close to 0%.

FIG. 12 is a timing chart illustrating an example of three-phase PWM signals generated according to the present embodiment when the rising edge timing of the U-phase PWM signal PU matches the rising edge timing of the V-phase PWM signal PV in a state where the duty ratios of the U-phase PWM signal PU and the V-phase PWM signal PV are close to 0%. As illustrated in FIG. 12, in the present embodiment, when the duty ratios of the voltage fluctuations of two-phase connection terminals at which the terminal voltage fluctuations are predicted to occur in the same direction and at the same timing are included in a range from a second threshold value to 0%, the MCU 12 sets the duty ratios of the voltage fluctuations of the two-phase connection terminals to 0% or more.

Specifically, in the countdown period from time t1 to time t2, for example, the MCU 12 delays the rising edge timing of the V-phase PWM signal PV by a first time ΔT4 and advances the rising edge timing of the U-phase PWM signal PU by a second time ΔT3. The total value of the first time ΔT4 and the second time ΔT3 is equal to the predetermined time ΔT. As a result, the time difference between the rising edge timing of the V-phase PWM signal PV and the rising edge timing of the U-phase PWM signal PU becomes relatively equal to the predetermined time ΔT, so that the simultaneous switching of the V-phase and the U-phase can be avoided. Even when the duty ratios of the V-phase PWM signal and the W-phase PWM signal are close to 0%, PWM signals can be generated by a normal method of generating the PWM signals by comparing the triangular wave TW with the three-phase duty command values. The first time ΔT4 and the second time ΔT3 each may be ½ of the predetermined time ΔT, but the first time ΔT4 and the second time ΔT3 may be appropriately adjusted so as to be within the same slope of the triangular wave TW even after the switching timing is shifted.

As illustrated in FIG. 12, in the count-up period from time t2 to time t3, the MCU 12 delays the falling edge timing of the V-phase PWM signal PV by the first time ΔT4 and advances the falling edge timing of the U-phase PWM signal PU by the second time ΔT3. As described above, in the present embodiment, the MCU 12 performs the compensation process of delaying the next falling edge timing by the same first time ΔT4 after delaying the rising edge timing of the V-phase PWM signal PV by the first time ΔT4. Similarly, after advancing the rising edge timing of the U-phase PWM signal PU by the second time ΔT3, the MCU 12 performs the compensation process of advancing the next falling edge timing by the same second time ΔT3. By performing these compensation processes, it is possible to suppress an influence on the motor control caused by the shift of the switching timings of the V phase and the U phase.

Hereinafter, the operation of the MCU 12 in the example illustrated in FIG. 12 will be described in detail.

The MCU core 12*a* of the MCU 12 executes a command value calculation process before the countdown start time t1 which is the update timing of the three-phase duty command values, and predicts whether or not the edge timings of two-phase PWM signals among the three-phase PWM signals match, on the basis of the three-phase duty command values calculated by the command value calculation process. For example, when the V-phase duty command value DV and the U-phase duty command value DU are equal among the three-phase duty command values calculated before the countdown start time t1, the MCU core 12*a* predicts that the rising edge timing of the V-phase PWM signal PV matches the rising edge timing of the U-phase PWM signal PU in the countdown period from time t1 to time t2.

When the MCU core 12*a* predicts that the rising edge timing of the V-phase PWM signal PV matches the rising edge timing of the U-phase PWM signal PU, and determines that the duty ratios of the V phase and the U phase are included in the range from the second threshold to 0%, the MCU core performs the correction process of subtracting a value corresponding to the first time ΔT4 from the calculated value of the V-phase duty command value DV, and performs the correction process of adding a value corresponding to the second time ΔT3 to the calculated value of the U-phase duty command value DU. The MCU core 12*a* outputs the W-phase duty command value DW calculated by the command value calculation process and the V-phase duty command value DV and the U-phase duty command value DU subjected to the correction process, to the PWM module 12*b*.

As described above, the three-phase duty command values input from the MCU core 12*a* to the PWM module 12*b* before the countdown start time t1 are temporarily stored in the buffer registers. Then, when the countdown start time t1 arrives, the three-phase duty command values stored in the buffer registers are transferred to the update registers. As described above, at the countdown start time t1, the contents of the update registers are updated to the new three-phase duty command values. As a result, as illustrated in FIG. 12, among the three-phase PWM signals generated by PWM module 12*b* in the countdown period from time t1 to time t2, the rising edge timing of V-phase PWM signal PV is delayed by first time ΔT4, and the rising edge timing of U-phase PWM signal PU is advanced by second time ΔT3.

The MCU core 12*a* executes the command value calculation process again before the count-up start time t2 which is the next update timing of the three-phase duty command values. The MCU core 12*a* performs a compensation process on the duty command value subjected to the correction process at the time of execution of the previous command value calculation process, among the three-phase duty command values calculated by the current command value calculation process. For example, among the three-phase duty command values calculated by the current command value calculation process, the MCU core 12*a* performs the compensation process of adding a value corresponding to the first time ΔT4 to the calculated value of the V-phase duty command value DV, and performs the compensation process of subtracting a value corresponding to the second time ΔT3 from the calculated value of the U-phase duty command value DU. The MCU core 12*a* outputs the W-phase duty command value DW calculated by the current command value calculation process and the V-phase duty command value DV and the U-phase duty command value DU subjected to the compensation process, to the PWM module 12*b*.

As described above, the three-phase duty command values input from the MCU core 12*a* to the PWM module 12*b* before the count-up start time t2 are temporarily stored in the buffer registers. Then, when the count-up start time t2 arrives, the three-phase duty command values stored in the buffer registers are transferred to the update registers. As described above, at the count-up start time t2, the contents of the update registers are updated to the new three-phase duty command values. As a result, as illustrated in FIG. 12, among the three-phase PWM signals generated by the PWM module 12*b* in the count-up period from time t2 to time t3, the falling edge timing of the V-phase PWM signal PV is delayed by the first time ΔT4, and the falling edge timing of the U-phase PWM signal PW is advanced by the second time ΔT3.

Figure 13:
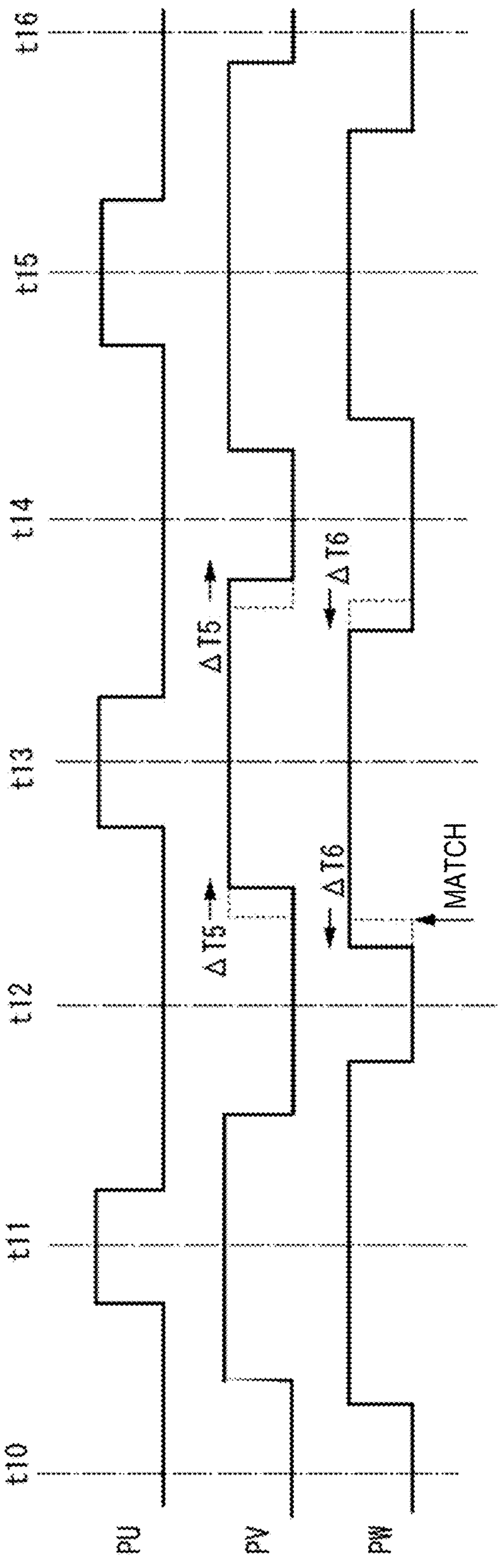
FIG. 13 is a timing chart illustrating an example of three-phase PWM signals generated by the present embodiment when a rising edge timing of a V-phase PWM signal matches a rising edge timing of a W-phase PWM signal in a state where the duty ratio of the V-phase PWM signal tends to increase and the duty ratio of the W-phase PWM signal tends to decrease.

As illustrated in FIG. 13, when the duty ratio of the voltage fluctuation of one connection terminal, among two-phase connection terminals in which the terminal voltage fluctuations are predicted to occur in the same direction and at the same timing, tends to increase and the duty ratio of the voltage fluctuation of the other connection terminal tends to decrease, if it is predicted that the voltage fluctuations of the two-phase connection terminals occur in the rising direction and at the same timing, the MCU 12 delays the rising edge timing and the next falling edge timing of the voltage fluctuation of the one connection terminal by a first time ΔT5 and advances the rising edge timing and the next falling edge timing of the voltage fluctuation of the other connection terminal by a second time ΔT6. The total value of the first time ΔT5 and the second time ΔT6 is equal to the predetermined time ΔT.

FIG. 13 is a timing chart illustrating an example of three-phase PWM signals generated according to the present embodiment in the case where the rising edge timing of the V-phase PWM signal PV matches the rising edge timing of the W-phase PWM signal PW in a state where the duty ratio of the V-phase PWM signal PV tends to increase and the duty ratio of the W-phase PWM signal PW tends to decrease. In this case, the MCU 12 delays the rising edge timing and the next falling edge timing of the V-phase PWM signal PV by the first time ΔT5, and advances the rising edge timing and the next falling edge timing of the W-phase PWM signal PW by the second time ΔT6.

In the example illustrated in FIG. 13, since the turn-on timing of the V-phase PWM signal originally matches the turn-on timing of the W-phase PWM signal, the W-phase is earlier than the V-phase or the same timing at the next turn-off timing. Therefore, in the case of the example illustrated in FIG. 13, the timings of the V phase and the W phase can be avoided from matching again at the next turn-off timing by advancing the W phase and delaying the V phase.

Figure 14:
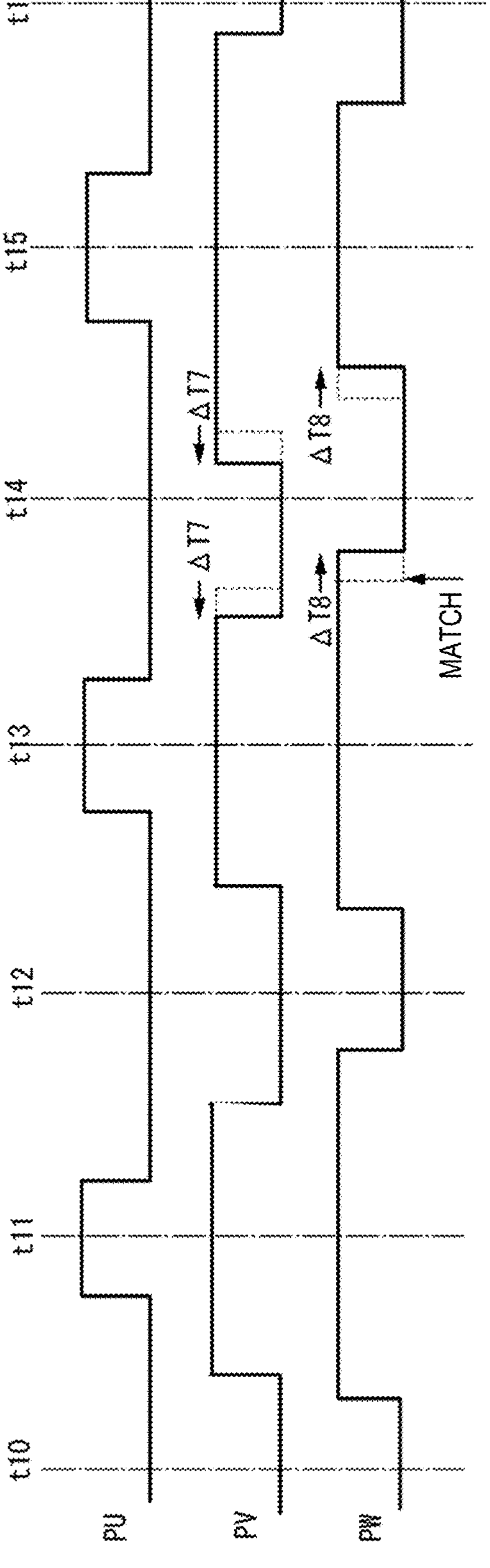
FIG. 14 is a timing chart illustrating an example of three-phase PWM signals generated by the present embodiment when a falling edge timing of a V-phase PWM signal matches a falling edge timing of a W-phase PWM signal in a state where the duty ratio of the V-phase PWM signal tends to increase and the duty ratio of the W-phase PWM signal tends to decrease.

As illustrated in FIG. 14, in the case where the duty ratio of the voltage fluctuation of one connection terminal, of the two-phase connection terminals in which the terminal voltage fluctuations are predicted to occur in the same direction and at the same timing, tends to decrease and the duty ratio of the voltage variation of the other connection terminal tends to increase, when the voltage fluctuations of the two-phase connection terminals are predicted to occur in the falling direction and at the same timing, the MCU 12 delays the falling edge timing and the next rising edge timing of the voltage variation of the one connection terminal by a first time ΔT8 and advances the falling edge timing and the next rising edge timing of the voltage variation of the other connection terminal by a second time ΔT7. The total value of the first time ΔT8 and the second time ΔT7 is equal to the predetermined time ΔT.

FIG. 14 is a timing chart illustrating an example of three-phase PWM signals generated by the present embodiment when the falling edge timing of the V-phase PWM signal matches the falling edge timing of the W-phase PWM signal in a state where the duty ratio of the V-phase PWM signal PV tends to increase and the duty ratio of the W-phase PWM signal PW tends to decrease. In this case, the MCU 12 delays the falling edge timing and the next rising edge timing of the W-phase PWM signal PW by the first time ΔT8, and advances the falling edge timing and the next rising edge timing of the V-phase PWM signal PV by the second time ΔT7.

In the example illustrated in FIG. 14, since the turn-off timing of the V-phase PWM signal originally matches the turn-off timing of the W-phase PWM signal, the V-phase is earlier than or the same timing as the W-phase at the next turn-on timing. Therefore, in the case of the example illustrated in FIG. 14, the timings of the V phase and the W phase can be avoided from matching again at the next turn-off timing by advancing the V phase and delaying the W phase.

Figure 15:
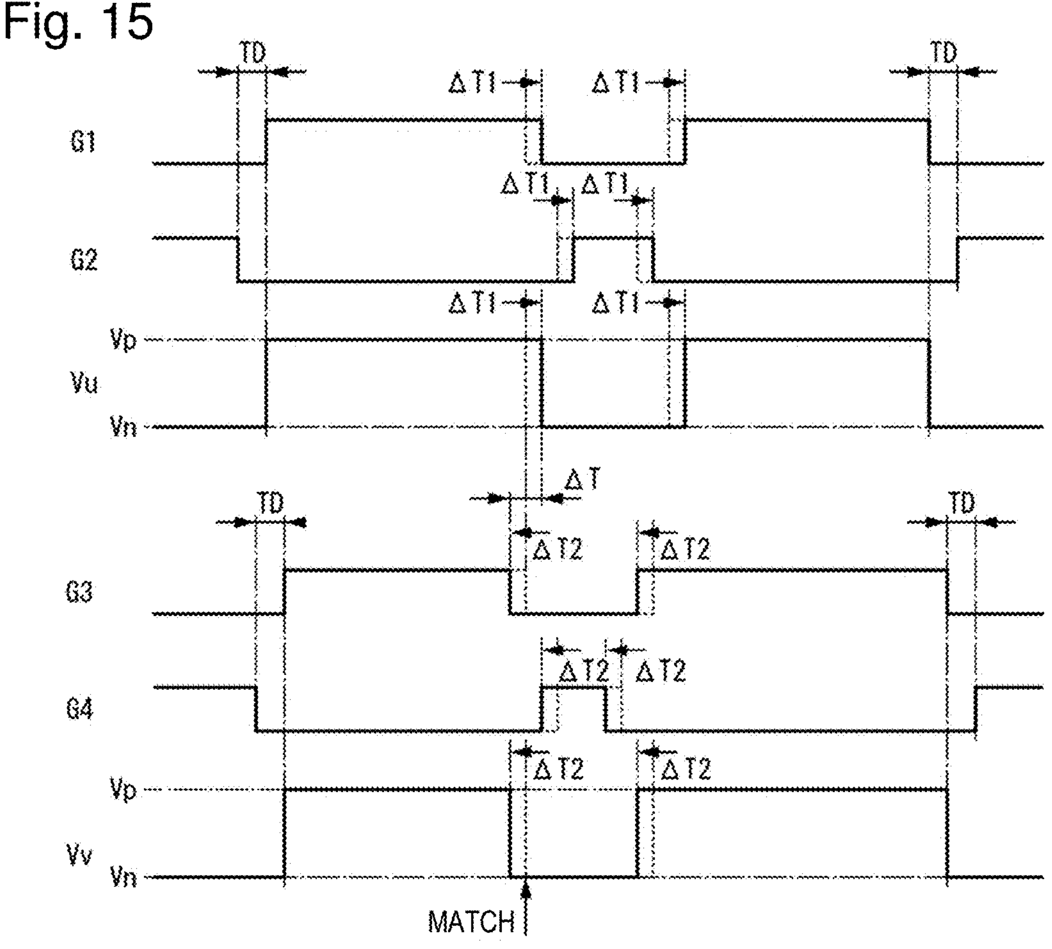
FIG. 15 is a timing chart illustrating an example of waveforms of a U-phase upper gate control signal G1, a U-phase lower gate control signal G2, a U-phase terminal voltage Vu, a V-phase upper gate control signal G3, a V-phase lower gate control signal G4, and a V-phase terminal voltage Vv, in the case where both directions of the U-phase and V-phase currents are directions from the power conversion circuit toward the three-phase motor.

In the above description, the three-phase PWM signals in which the dead time is not considered are used, but the dead time is provided to the gate control signal supplied to each arm switch of the power conversion circuit 11. FIG. 15 is a timing chart illustrating an example of waveforms of the U-phase upper gate control signal G1, the U-phase lower gate control signal G2, the U-phase terminal voltage Vu, the V-phase upper gate control signal G3, the V-phase lower gate control signal G4, and the V-phase terminal voltage Vv, in the case where both directions of the U-phase and V-phase currents are directions from the power conversion circuit 11 toward the three-phase motor 20. In FIG. 15, the U-phase terminal voltage Vu is a voltage of the U-phase connection terminal 13*u*, and the V-phase terminal voltage Vv is a voltage of the V-phase connection terminal 13*v*. Further, in FIG. 15, Vp represents the positive electrode potential of the DC power supply 30, and Vn represents the negative electrode potential of the DC power supply 30. For simplicity of explanation, the voltage drop when conducting the IGBT and the diode is ignored in FIG. 15.

As illustrated in FIG. 15, a dead time TD is inserted between the U-phase upper gate control signal G1 and the U-phase lower gate control signal G2, and the dead time TD is also inserted between the V-phase upper gate control signal G3 and the V-phase lower gate control signal G4. When both the directions of the U-phase and V-phase currents are the direction from the power conversion circuit 11 toward the three-phase motor 20, the U-phase terminal voltage Vu fluctuates in synchronization with the U-phase upper gate control signal G1, and the V-phase terminal voltage Vv fluctuates in synchronization with the V-phase upper gate control signal G3.

As illustrated in FIG. 15, for example, it is assumed that the U-phase upper gate control signal G1 matches the V-phase upper gate control signal G3 at the off timing. In this case, since the U-phase terminal voltage Vu and the V-phase terminal voltage Vv simultaneously fluctuate from the positive electrode potential Vp to the negative electrode potential Vn of the DC power supply 30, the potential fluctuation of the neutral point N of the three-phase motor 20 becomes larger as compared with the case where only one phase fluctuates, and accordingly, the axial voltage of the three-phase motor 20 also greatly fluctuates to cause noise.

In order to avoid this, in the present embodiment, when the off-timings of the U-phase upper gate control signal G1 and the V-phase upper gate control signal G3 are closer than the predetermined time ΔT, that is, when there is a possibility that the phase voltage fluctuation timings match due to a delay of the gate driver or the like, the off-timing of the U-phase upper gate control signal G1 and the on-timing adjacent thereto are delayed by the first time ΔT1. Accordingly, with respect to the U-phase lower gate control signal G2, the on-timing and the off-timing corresponding to the U-phase upper gate control signal G1 are also delayed by the first time ΔT1 so as to maintain the dead time TD. As a result, the waveform of the U-phase terminal voltage Vu is also delayed by the first time ΔT1.

In the present embodiment, the off-timing of the V-phase upper gate control signal G3 and the on-timing adjacent thereto are advanced by the second time ΔT2. Accordingly, with respect to the V-phase lower gate control signal G4, the on-timing and the off-timing corresponding to the V-phase upper gate control signal G3 are also advanced by the second time ΔT2 so as to maintain the dead time TD. As a result, the waveform of the V-phase terminal voltage Vv is also advanced by the second time ΔT2. The total value of the first time ΔT1 and the second time ΔT2 is equal to the predetermined time ΔT. With the above operation, it is possible to prevent the two phase voltages from simultaneously fluctuating in the same direction, and as a result, it is possible to suppress the axial voltage of the three-phase motor 20 from greatly fluctuating instantaneously.

Figure 16:
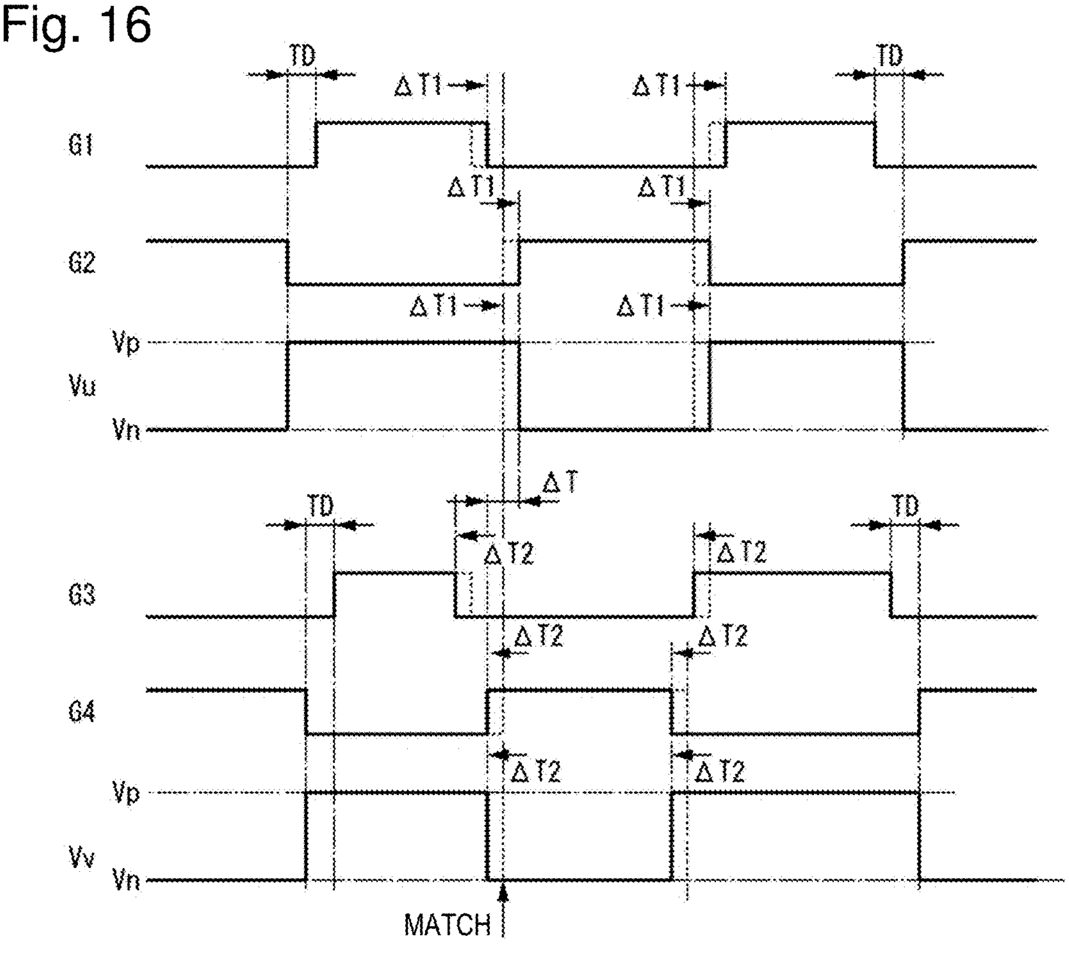
FIG. 16 is a timing chart illustrating an example of waveforms of a U-phase upper gate control signal G1, a U-phase lower gate control signal G2, a U-phase terminal voltage Vu, a V-phase upper gate control signal G3, a V-phase lower gate control signal G4, and a V-phase terminal voltage Vv, in the case where both directions of the U-phase and V-phase currents are directions from the three-phase motor toward the power conversion circuit.

FIG. 16 is a timing chart illustrating an example of waveforms of the U-phase upper gate control signal G1, the U-phase lower gate control signal G2, the U-phase terminal voltage Vu, the V-phase upper gate control signal G3, the V-phase lower gate control signal G4, and the V-phase terminal voltage Vv, in the case where both directions of the U-phase and V-phase currents are directions from the three-phase motor 20 toward the power conversion circuit 11.

As illustrated in FIG. 16, the dead time TD is inserted between the U-phase upper gate control signal G1 and the U-phase lower gate control signal G2, and the dead time TD is also inserted between the V-phase upper gate control signal G3 and the V-phase lower gate control signal G4. When both directions of the U-phase and V-phase currents are directions from the three-phase motor 20 toward the power conversion circuit 11, the U-phase terminal voltage Vu fluctuates in synchronization with the U-phase lower gate control signal G2, and the V-phase terminal voltage Vv fluctuates in synchronization with the V-phase lower gate control signal G4.

As illustrated in FIG. 16, for example, it is assumed that the U-phase lower gate control signal G2 matches the V-phase lower gate control signal G4 at the on-timing. In this case, since the U-phase terminal voltage Vu and the V-phase terminal voltage Vv simultaneously fluctuate from the positive electrode potential Vp to the negative electrode potential Vn of the DC power supply 30, the axial voltage of the three-phase motor 20 also greatly fluctuates, which causes noise. In order to avoid this, in the present embodiment, when the off-timings of the U-phase lower gate control signal G2 and the V-phase lower gate control signal G4 are closer than the predetermined time ΔT, the on-timing of the U-phase lower gate control signal G2 and the off-timing adjacent thereto are delayed by the first time ΔT1. Accordingly, in the U-phase upper gate control signal G1, the on-timing and the off-timing corresponding to the U-phase lower gate control signal G2 are also delayed by the first time ΔT1 so as to maintain the dead time TD. As a result, the waveform of the U-phase terminal voltage Vu is also delayed by the first time ΔT1.

In the present embodiment, the on-timing of the V-phase lower gate control signal G4 and the off-timing adjacent thereto are advanced by the second time ΔT2. Accordingly, in the V-phase upper gate control signal G3, the on-timing and the off-timing corresponding to the V-phase lower gate control signal G4 are also advanced by the second time ΔT2 so as to maintain the dead time TD. As a result, the waveform of the V-phase terminal voltage Vv is also advanced by the second time ΔT2. The total value of the first time ΔT1 and the second time ΔT2 is equal to the predetermined time ΔT. With the above operation, it is possible to prevent the two phase voltages from simultaneously fluctuating in the same direction, and as a result, it is possible to suppress the axial voltage of the three-phase motor 20 from greatly fluctuating instantaneously.

Although FIG. 16 illustrates the case where both the U-phase current and the V-phase current are in the direction from the three-phase motor 20 toward the power conversion circuit 11, description will be given below on the case where both current directions are opposite to each other, that is, for example, the case where the U-phase current is in the direction from the power conversion circuit 11 toward the three-phase motor 20 and the V-phase current is in the direction from the three-phase motor 20 toward the power conversion circuit 11.

In this case, the U-phase terminal voltage Vu fluctuates in synchronization with the U-phase upper gate control signal G1, and the V-phase terminal voltage Vv fluctuates in synchronization with the V-phase lower gate control signal G4. For example, when the off-timing of the U-phase upper gate control signal G1 matches the on-timing of the V-phase lower gate control signal G4, the U-phase terminal voltage Vu and the V-phase terminal voltage Vv simultaneously fluctuate from the positive electrode potential Vp to the negative electrode potential Vn of the DC power supply 30. When the terminal voltages of a plurality of phases fluctuate simultaneously and in the same direction as described above, the axial voltage of the three-phase motor 20 also greatly fluctuates, which may cause noise. In order to suppress this, when the current and the on-off timing satisfy the above-described conditions, for example, the off-timing of the U-phase upper gate control signal G1 is delayed by the first time ΔT1, and the following on-timing and off-timing of the U-phase lower gate control signal G2 and the on-timing of the U-phase upper gate control signal G1 are sequentially delayed by the first time ΔT1. Further, the on-timing of the V-phase lower gate control signal G4 is advanced by the second time ΔT2, and the off-timing of the V-phase upper gate control signal G3 immediately before it, and the following off-timing of the V-phase lower gate control signal G4 and on-timing of the V-phase upper gate control signal G3 are sequentially advanced by the second time ΔT2. The total value of the first time ΔT1 and the second time ΔT2 is equal to the predetermined time ΔT. With the above operation, it is possible to suppress the axial voltage of the three-phase motor 20 from greatly fluctuating instantaneously while suppressing an influence on the motor control.

As described above, in the present embodiment, in the case of providing the dead time, it is determined whether the voltage fluctuation of at least two phase connection terminals among the three-phase connection terminals 13*u*, 13*v*, and 13*w* has occurred in the same direction and at the same timing, in consideration of (1) whether the terminal voltage fluctuation is synchronized with the upper gate control signal or the lower gate control signal varies depending on the direction of the current, and (2) whether the turn-on timing is delayed by the dead time due to the provided dead time, for example.

As described above, according to one embodiment of the present disclosure, it is avoided that voltage fluctuations of the connection terminals of at least two phases, among the three-phase connection terminals 13*u*, 13*v*, and 13*w*, occur in the same direction and at the same timing, and thus, it is possible to suppress instantaneous large fluctuation of the axial voltage of the three-phase motor 20. That is, according to one embodiment of the present disclosure, it is possible to reduce the noise caused by instantaneous large fluctuation of the axial voltage. As a result, according to one embodiment of the present disclosure, it is possible to suppress occurrence of electrolytic corrosion in the rotor bearing of the three-phase motor 20.

The present invention is not limited to the above embodiment, and the configurations described in the present description can be appropriately combined within a range not conflicting with one another.

For example, in the above embodiment, the motor control device 10 that controls the three-phase motor 20 has been exemplified, but the motor to be controlled is not limited to the three-phase motor 20, and may be an n-phase motor (n is an integer of 3 or more).

In the above embodiment, the IGBT is exemplified as each arm switch included in the power conversion circuit 11, but each arm switch may be, for example, a high-power switching element other than the IGBT such as a MOS-FET.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control device that controls an n-phase motor, the motor control device comprising:

a power conversion circuit that is connected to the n-phase motor and performs mutual conversion between DC power and n-phase AC power; and a control unit that controls the power conversion circuit based on n-phase duty command values updated at a predetermined update cycle, wherein when the control unit predicts, based on the n-phase duty command values, that voltage fluctuations of at least two-phase connection terminals among the n-phase connection terminals connected to the n-phase motor occur in a same direction and at a same timing, the control unit delays an occurrence timing of the voltage fluctuation of one connection terminal of the two-phase connection terminals by a first time and advances an occurrence timing of the voltage fluctuation of another connection terminal by a second time, and a total value of the first time and the second time is a predetermined time during which predetermined occurrence timings of the voltage fluctuations of the two-phase connection terminals do not overlap each other.

2. The motor control device according to claim 1, wherein the control unit determines each of the first time and the second time to be a value corresponding to ½ of the predetermined time.

3. The motor control device according to claim 1, wherein when duty ratios of the voltage fluctuations of the two-phase connection terminals are included in a range from a first threshold to 100%, the control unit sets the duty ratios of the voltage fluctuations of the two-phase connection terminals to 100% or less.

4. The motor control device according to claim 1, wherein when duty ratios of the voltage fluctuations of the two-phase connection terminals are included in a range from a second threshold to 0%, the control unit sets the duty ratios of the voltage fluctuations of the two-phase connection terminals to 0% or more.

5. The motor control device according to claim 1, wherein when a duty ratio of the voltage fluctuation of the one connection terminal tends to increase and a duty ratio of the voltage fluctuation of the other connection terminal tends to decrease, and the control unit predicts that the voltage fluctuations of the two-phase connection terminals occur in a rising direction and at a same timing, the control unit delays a rising edge timing and a next falling edge timing of the voltage fluctuation of the one connection terminal by the first time and advances a rising edge timing and a next falling edge timing of the voltage fluctuation of the other connection terminal by the second time.

6. The motor control device according to claim 1, wherein when a duty ratio of the voltage fluctuation of the one connection terminal tends to decrease and a duty ratio of the voltage fluctuation of the other connection terminal tends to increase, and the control unit predicts that the voltage fluctuations of the two-phase connection terminals occur in a falling direction and at a same timing, the control unit delays a falling edge timing and a next rising edge timing of the voltage fluctuation of the one connection terminal by the first time and advances a falling edge timing and a next rising edge timing of the voltage fluctuation of the other connection terminal by the second time.

* * * * *